US012049375B2

(12) United States Patent
Tateishi et al.

(10) Patent No.: US 12,049,375 B2
(45) Date of Patent: Jul. 30, 2024

(54) SHEET FEEDING APPARATUS AND IMAGE FORMING APPARATUS

(71) Applicant: CANON KABUSHIKI KAISHA, Tokyo (JP)

(72) Inventors: Tomoya Tateishi, Kanagawa (JP); Kazuhiro Hosohara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 17/496,856

(22) Filed: Oct. 8, 2021

(65) Prior Publication Data

US 2022/0127089 A1 Apr. 28, 2022

(30) Foreign Application Priority Data

Oct. 27, 2020 (JP) ................................ 2020-179583
Apr. 28, 2021 (JP) ................................ 2021-075791

(51) Int. Cl.
*B65H 3/06* (2006.01)
*G03G 15/00* (2006.01)

(52) U.S. Cl.
CPC ......... *B65H 3/0607* (2013.01); *B65H 3/0684* (2013.01); *G03G 15/6529* (2013.01)

(58) Field of Classification Search
CPC ................ B65H 3/0684; B65H 3/0669; B65H 2405/324; B65H 2407/21
See application file for complete search history.

(56) References Cited

U.S. PATENT DOCUMENTS

| | | | | |
|---|---|---|---|---|
| 7,036,813 | B2 | 5/2006 | Asada | |
| 9,272,862 | B2 * | 3/2016 | Tateishi | B65H 7/02 |
| 9,873,576 | B2 * | 1/2018 | Kondo | B65H 1/04 |
| 10,155,634 | B2 * | 12/2018 | Murata | B65H 1/04 |
| 10,988,334 | B2 * | 4/2021 | Uchida | G03G 21/1638 |
| 2005/0062217 | A1 | 3/2005 | Asada | |
| 2015/0084263 | A1 * | 3/2015 | Kanzawa | B65H 3/0684 271/3.2 |
| 2015/0251863 | A1 * | 9/2015 | Tateishi | B65H 5/062 271/152 |
| 2016/0327897 | A1 * | 11/2016 | Kondo | G03G 15/6529 |
| 2016/0347560 | A1 * | 12/2016 | Murata | H04N 1/00588 |

(Continued)

FOREIGN PATENT DOCUMENTS

| | | |
|---|---|---|
| JP | 2005-060026 A | 3/2005 |
| JP | 2016-222457 A | 12/2016 |

*Primary Examiner* — Patrick Cicchino
(74) *Attorney, Agent, or Firm* — VENABLE LLP

(57) ABSTRACT

A sheet feeding apparatus includes an opening/closing unit including a stacking portion, a moving unit including a feed roller and a moving member supporting the feed roller, an urging portion, and a transmitting portion to transmit urging force of the urging portion to the moving member. The opening/closing unit presses and moves the moving unit in the second direction against the urging force while the opening/closing unit moves from the open position to the closed position. A force that the opening/closing unit receives from the moving unit in a state where the opening/closing unit is at the closed position is smaller than a maximum force that the opening/closing unit receives from the moving unit that is urged in the first direction by the urging portion while the opening/closing unit moves from the open position to the closed position.

19 Claims, 10 Drawing Sheets

(56) References Cited

U.S. PATENT DOCUMENTS

| | | | | |
|---|---|---|---|---|
| 2017/0066608 | A1* | 3/2017 | Kondo ................. | B65H 3/0684 |
| 2021/0188574 | A1 | 6/2021 | Yokota et al. | |
| 2022/0127090 | A1* | 4/2022 | Tateishi ............... | B65H 3/0684 |

* cited by examiner (COMPARATIVE ART)

(COMPARATIVE ART)

SHEET FEEDING APPARATUS AND IMAGE FORMING APPARATUS

BACKGROUND OF THE INVENTION

Field of the Invention

The present invention relates to a sheet feeding apparatus configured to feed a sheet and to an image forming apparatus configured to form an image on the sheet.

Description of the Related Art

Some image forming apparatuses such as a printer, a copier and a multifunction printer are provided with a manual tray type sheet feeding apparatus (referred to also as a multi-purpose sheet feeding apparatus) configured to feed a sheet serving as a recording material from a stacking tray provided on a side surface of an apparatus body. For the sheet feeding apparatus of this sort, a configuration of moving a lift member that supports a pickup roller or feed roller, configured to deliver a sheet out of the stacking tray is used to bring the pickup roller into contact with and to separate from the sheet on the stacking tray. The lift member is urged downward in a moving direction by a spring member or the like to bring the pickup roller into contact with the sheet with a predetermined pressurizing force and is controlled by a cam mechanism or the like.

By the way, while the manual tray type stacking tray is provided in an opening/closing unit openable with respect to the side surface of the apparatus body, the stacking tray is stored within the apparatus body by closing the opening/closing unit in a case where the stacking tray is not used. Meanwhile, the lift member is required to have a certain length in order to stably bring the pickup roller into contact with and to separate from the sheet by swing operations of the lift member. Therefore, such lift member having the certain length and the pickup roller are stored within the apparatus body in a case where the opening/closing unit is closed in the configuration of the manual tray type.

Japanese Patent Application Laid-open No. 2016-222457 discloses that a lift plate and a pickup roller are located at project positions outside of a side surface of an apparatus body in a state in which a tray is opened and are stored in the side surface of the apparatus body in linkage with an operation of closing the tray. In this case, the lift plate and the pickup roller are moved toward the apparatus body as the tray comes into contact with and pushes up the pickup roller along with the operation of closing the tray.

However, because the pickup roller is lifted up against urging force of a pressurizing spring that urges the lifting plate downward in closing the tray in the configuration of the Japanese Patent Application Laid-open No. 2016-222457, the tray is pressed from the pickup roller by the urging force of the pressurizing spring. Because a deformation amount of the pressurizing spring is maximized in a state in which the tray is closed, a force of the pickup roller pressing the tray is also maximized in the state in which the tray is closed. Therefore, there is a possibility that the tray causes a creep deformation if the pressurizing force caused by the urging force of the pressurizing spring acts on the tray, for a long period of time under a high temperature environment for example.

SUMMARY OF THE INVENTION

The present invention provides a sheet feeding apparatus and an image forming apparatus capable of suppressing an opening unit from being deformed.

According to one aspect of the invention, a sheet feeding apparatus includes an opening/closing unit including a stacking portion on which a sheet is stacked, and configured to be opened and closed between an open position and a closed position with respect to an apparatus body of the sheet feeding apparatus, a moving unit including a feed roller configured to feed the sheet and a moving member supporting the feed roller, the moving member being movable with respect to the stacking portion in a first direction in which the feed roller approaches the stacking portion and in a second direction opposite to the first direction, an urging portion, and a transmitting portion configured to transmit urging force of the urging portion to the moving member to urge the moving member in the first direction, wherein the opening/closing unit is configured to press and move the moving unit in the second direction against the urging force while the opening/closing unit moves from the open position to the closed position, and wherein a force that the opening/closing unit receives from the moving unit in a state where the opening/closing unit is at the closed position is smaller than a maximum force that the opening/closing unit receives from the moving unit that is urged in the first direction by the urging portion while the opening/closing unit moves from the open position to the closed position.

According to another aspect of the invention, a sheet feeding apparatus includes an opening/closing unit including a stacking portion on which a sheet is stacked, and configured to be opened and closed between an open position and a closed position with respect to an apparatus body of the sheet feeding apparatus, a moving unit including a feed roller configured to feed the sheet and a moving member supporting the feed roller, the moving member being movable with respect to the stacking portion in a first direction in which the feed roller approaches the stacking portion and in a second direction opposite to the first direction, an urging portion, a transmitting portion configured to transmit urging force of the urging portion to the moving member to urge the moving member in the first direction, and a restrict member configured to move between a restrict position where the restrict member is in contact with the transmitting portion to restrict movement of the transmitting portion and a release position where the restrict member retracts from the restrict position, and wherein the opening/closing unit is configured to press and move the moving unit in the second direction against the urging force while the opening/closing unit moves from the open position to the closed position, wherein in a state where the opening/closing unit is at the open position and the transmitting portion is in contact with the restrict member located at the restrict position, the feed roller is configured to be at a position separated from the stacking portion, wherein in a state where the opening/closing unit is at a position between the open position and the closed position, the moving unit is configured to be in contact with the opening/closing unit and the transmitting portion is configured to urge the moving member in the first direction, and wherein in a state where the opening/closing unit is at the closed position, the transmitting portion is configured to urge the moving member in the second direction.

Further features of the present invention will become apparent from the following description of exemplary embodiments with reference to the attached drawings.

DESCRIPTION OF THE EMBODIMENTS

An embodiment according to the present disclosure will be described with reference to the drawings.

Figure 1:
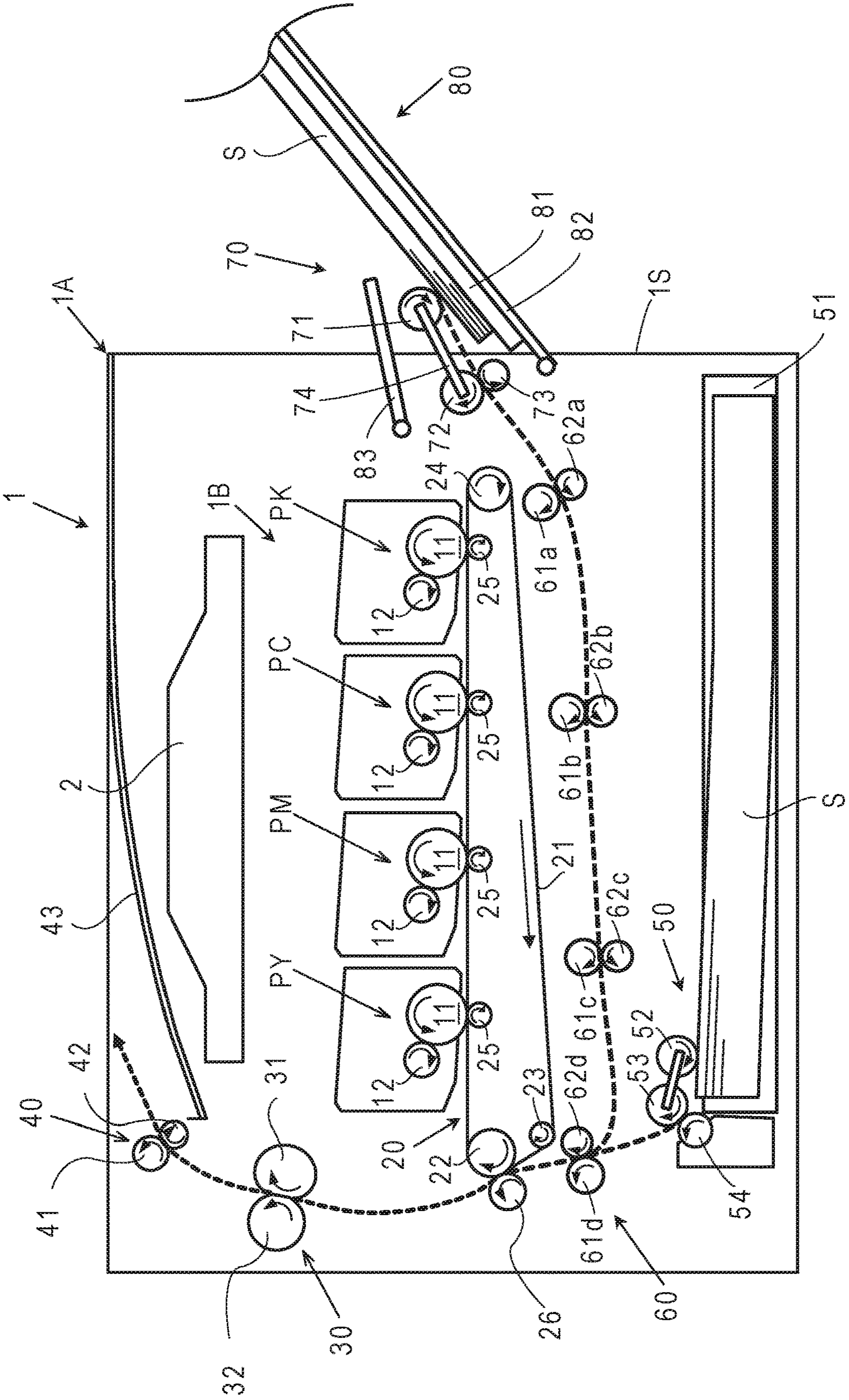
FIG. 1 is a schematic diagram illustrating a configuration of an image forming apparatus according to an embodiment of the present disclosure.

FIG. 1 is a schematic diagram illustrating a configuration of a laser beam printer serving as an image forming apparatus 1 of the present embodiment. Overall configurations and functions of the image forming apparatus 1 will be described below. Mounted as an image forming unit within an apparatus body 1A of the image forming apparatus 1 is an image forming portion 1B in which four process cartridges PY, PM, PC and PK are arrayed approximately in a horizontal direction, i.e., in an inline constitution or in a tandem type constitution. Even though colors of toners stored as developers are different, structures of the process cartridges PY through PK are substantially the same with each other. Each of the process cartridges PY through PK of the present embodiment is a unit in which a photosensitive drum 11 serving as an image bearing member or an electro-photographic photosensitive member and processing members acting on the photosensitive drum 11 such as a developing roller 12 are integrally assembled. The process cartridges PY through PK are each configured to be attachable to and detachable from the apparatus body 1A.

Disposed above the process cartridges PY through PK is a laser scanner 2 and disposed under the process cartridges PY through PK is an intermediate transfer belt unit 20. In the intermediate transfer belt unit 20, an intermediate transfer belt 21 serving as an intermediate transfer member is stretched by a driving roller 22, a driven roller 23 and a tension roller 24 and is rotated clockwise in the FIG. 1. Lower surfaces of the photosensitive drums 11 of the respective process cartridges PY through PK are in contact with an upper surface of the intermediate transfer belt 21. Disposed inside of the intermediate transfer belt 21 so as to face the photosensitive drums 11 of the respective process cartridges PY through PK are four primary transfer rollers 25. A secondary transfer roller 26 is brought into contact with the driving roller 22 through the intermediate transfer belt 21. Disposed at an upper part within the apparatus body 1A are a fixing unit 30 and a discharge unit 40. Disposed on an upper surface of the apparatus body 1A is a discharge tray 43. The fixing unit 30 includes a fixing film 31 having a heater substrate therein and a pressurizing roller 32 in pressure contact with the heater substrate through the fixing film 31. The discharge unit 40 includes a discharge roller 41 and a discharge roller 42.

In a case where the image forming apparatus 1 executes an image forming operation, the photosensitive drums 11 are rotated and surfaces of the photosensitive drums 11 are homogeneously charged. Based on image information i.e., printing data, received from an external device, the laser scanner 2 irradiates the photosensitive drums 11 and forms electrostatic latent images on the surfaces of the photosensitive drums 11, by scanning and exposing the surface of the photosensitive drum 11 with laser beams. These electrostatic latent images are visualized, i.e., are developed, as toner images by developing rollers 12.

The toner images that have been formed on the photosensitive drums 11 are primarily transferred onto the intermediate transfer belt 21 by the primary transfer rollers 25. At this time, the toner images formed in the respective process cartridges PY through PK are multiple transferred so as to be superimposed with each other to form a full-color toner image on the intermediate transfer belt 21. This toner image is borne by the intermediate transfer belt 21 and is conveyed to a secondary transfer portion, which is a nip portion between the intermediate transfer belt 21 and the secondary transfer roller 26.

In parallel with the operation of the image forming portion 1B described above, a sheet S serving as a recording material is fed from a sheet feeding apparatus 50 or 70 toward the image forming portion 1B. The image forming apparatus 1 is provided with the storage tray type sheet feeding apparatus 50 and the manual tray type sheet feeding apparatus 70. Note that as the sheet S, it is possible to use various sheets having different sizes and materials such as a sheet of paper including a plain sheet and a thick sheet, a plastic film, a cloth, a sheet material such as a coated sheet on which a surface treatment has been implemented and specially shaped sheet material such as an envelope and an index sheet.

The storage tray type sheet feeding apparatus 50 includes sheets S stacked within a storage tray 51 mounted drawably with respect to the apparatus body 1A and a feed unit including a pickup roller 52, a conveyance roller 53 and a separation roller 54. The pickup roller 52 comes into contact with an uppermost sheet of the sheets S stacked in the storage tray 51 and rotates to feed the sheet S in a left direction in FIG. 1. The conveyance roller 53 further conveys the sheet S received from the pickup roller 52. The separation roller 54 is in contact with the conveyance roller 53 to form a separation nip and separates the sheet S conveyed by the conveyance roller 53 from another sheet S by applying a frictional force to the sheets passing through the separation nip. Next, a leading edge of the sheet S delivered from the conveyance roller 53 is caused to butt against a nip portion between a conveyance roller 61*d* and a conveyance roller 62*d* of a conveyance roller pair 60, i.e., a registration roller pair, in a halt state to correct a skew of the sheet S.

The manual tray type sheet feeding apparatus 70 is provided on a side, i.e., on a right side surface in FIG. 1, of the apparatus body 1A. A sheet S stacked on a stacking tray 81 of a door unit 80 is fed one by one. A specific configuration of the sheet feeding apparatus 70 will be described later. The sheet S fed from the sheet feeding apparatus 70 is conveyed toward the conveyance roller pair 60 by conveyance rollers 61*a*, 61*b*, 61*c* and 61*d* and conveyance rollers

62*a*, 62*b*, 62*c* and 62*d*. Then, a leading edge of the sheet S is caused to butt against the nip portion of the conveyance roller pair 60 in a halt state to correct a skew of the sheet S. An operation of the image forming apparatus 1 performed on the sheet S after arriving at the nip portion of the conveyance roller pair 60 is substantially the same with the case where the sheet S is fed from the sheet feeding apparatus 50.

After correcting the skew of the sheet S, the conveyance roller pair 60 starts to convey the sheet S with a timing synchronized with the operation of the image forming portion 1B to convey the sheet S to the secondary transfer portion. The toner image borne on the intermediate transfer belt 21 is secondarily transferred onto the sheet S at the secondary transfer portion. The sheet S onto which the toner image has been transferred is sent to the fixing unit 30 to fix the toner image onto the sheet S by heat and pressure at a nip portion between a fixing film 31 and the pressurizing roller 32. After that, the sheet S is discharged out of the apparatus body 1A by a discharge driving roller 41 and a discharge driven roller 42 and is stacked onto a discharge tray 43.

The image forming portion 1B described above is one example of an image forming unit, and a direct transfer type electro-photographic mechanism of transferring a toner image formed on an image bearing member directly onto a sheet may be also used. Still further, not only the electro-photographic type, but also an inkjet type printing unit or an offset printing mechanism may be also used as the image forming unit.

Configuration and Operation of Manual Feed Tray Type Sheet Feeding Apparatus

Figure 2:
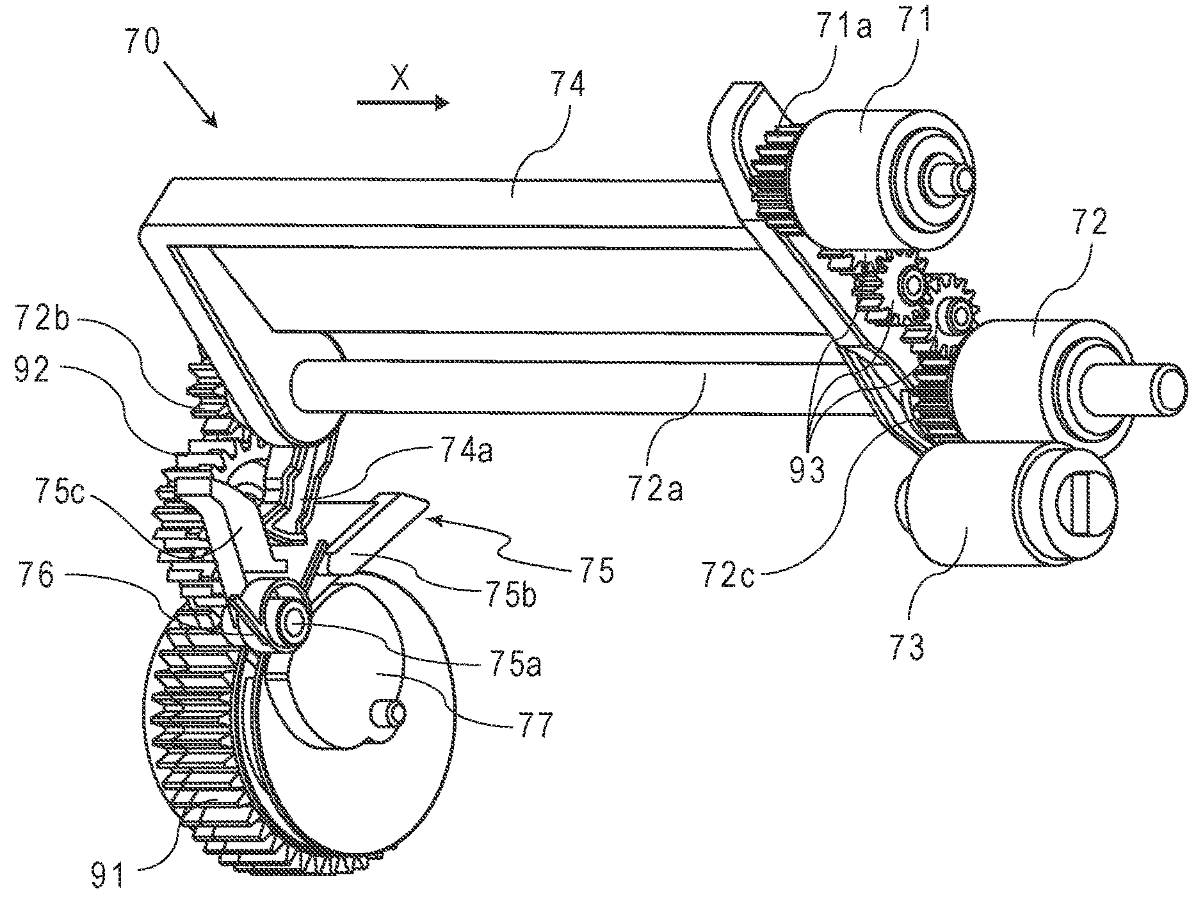
FIG. 2 is a perspective view illustrating a sheet feeding apparatus of the embodiment.

A configuration and a feed operation of the manual tray type sheet feeding apparatus 70 of the present embodiment will be described below. FIG. 2 is a perspective view illustrating a vicinity of the sheet feeding apparatus 70. As illustrated in FIGS. 1 and 2, the sheet feeding apparatus 70 includes a stacking tray 81 supported by a door unit 80 and a feed unit including a pickup roller 71, a conveyance roller 72, a separation roller 73 and a swing arm 74 serving as a lift arm or a moving arm. The door unit 80 serves as an opening/closing unit of the present embodiment configured to be opened and closed between an open position and a closed position (or a storage position) with respect to the apparatus body 1A. The stacking tray 81 serves as a stacking portion of the present embodiment. The pickup roller 71 serves as a feed roller of the present embodiment. The swing arm 74 serves as a swing member, i.e., a lift member or a moving member, of the present embodiment. Note that the apparatus body of the sheet feeding apparatus refers to a casing openably supporting the opening/closing unit, and the apparatus body 1A of the image forming apparatus 1 is an apparatus body of the sheet feeding apparatus 70 in the present embodiment. That is, the sheet feeding apparatus 70 may include the apparatus body 1A.

The pickup roller 71 comes in contact with an uppermost sheet of the sheets S stacked on the stacking tray 81 and rotates to deliver the sheet in a sheet feed direction, i.e., in a left direction in FIG. 1. The conveyance roller 72 further conveys the sheet S received from the pickup roller 71. The separation roller 73 is in contact with the conveyance roller 72 to form a separation nip and separates the sheet S conveyed by the conveyance roller 72 from another sheet S by applying a frictional force to the sheets passing through the separation nip. After that, the sheet S is conveyed toward the conveyance roller pair 60 as described above to be supplied to the image forming portion 1B.

It is noted that the separation roller 73 described above is, for example, a roller member connected to a shaft fixed to a frame member of the apparatus body 1A through a torque limiter. Instead of that, a roller to which a driving force in a direction against the rotation of the conveyance roller 72 is inputted may be used as the separation member. A pad-shaped friction member may be also used as the separation member.

As illustrated in FIG. 2, a feed roller shaft 72*a* supporting the conveyance roller 72 is rotatably supported by a bearing portion provided on the apparatus body 1A shown in FIG. 1. A roller shaft supporting the pickup roller 71 is rotatably supported by a swing arm 74. The swing arm 74 is provided swingably, i.e., movably or pivotably, centering on the feed roller shaft 72*a* and lifts and lowers the pickup roller 71 with respect to the sheet S on the stacking tray 81. This arrangement makes it possible to move the pickup roller 71 between a feed position, i.e., a lower position, where the pickup roller 71 is in contact with the sheet S and a separate position, i.e., an upper position, where the pickup roller 71 is separated from the sheet S. That is, the pickup roller 71 and the swing arm 74 are movable with respect to the apparatus body 1A and the stacking tray 81. Specifically, the pickup roller 71 and the swing arm 74 move with respect to the stacking tray 81 and the apparatus body 1A in a state in which the stacking tray 81 is stopped at a predetermined position with respect to the apparatus body 1A. The part including the swing arm 74 and the pickup roller 71 will be referred to as a moving unit. That is, the swing arm 74 and the pickup roller 71 are parts of the moving unit.

A position of the swing arm 74 corresponding to the feed position of the pickup roller 71 and a position of the swing arm 74 corresponding to the separate position of the pickup roller 71 will be described below respectively as a feed position and a separate position of the swing arm 74. Note that the lifting and lowering operation of the swing arm 74 is controlled by a lifting and lowering control mechanism described later.

Roller Driving Structure

A driving structure of the sheet feeding apparatus 70 will be described below. As illustrated in FIG. 2, the sheet feeding apparatus 70 is provided with a partially-toothless gear 91 rotated by a driving force supplied from a motor serving as a driving source provided in the apparatus body 1A. The sheet feeding apparatus 70 also includes an input gear 72*b*, an output gear 72*c* and a pickup gear 71*a* integrally rotating with the pickup roller 71. The conveyance roller 72, the feed roller shaft 72*a*, the input gear 72*b* and the output gear 72*c* are disposed coaxially and are configured to rotate in a body. The partially-toothless gear 91 is linked with the input gear 72*b* through an idler gear 92. The output gear 72*c* is also linked with the pickup gear 71*a* through an idler gear 93. The idler gear 93 and the pickup gear 71*a* are supported by the swing arm 74.

As the partially-toothless gear 91 rotates, the rotation thereof is transmitted to the input gear 72*b* through the idler gear 92, so that the output gear 72*c* and the conveyance roller 72 are rotated. As the pickup gear 71*a* disposed at an end portion of the pickup roller 71 is rotated through the idler gear 93 linked with and driven by the output gear 72*c*, the pickup roller 71 also rotates. Note that the partially-toothless gear 91 is a gear unit in which two spur gears each having a partially-toothless gear portion are superimposed and is configured such that the rotation thereof can be controlled by an electromagnetic solenoid not illustrated. The partially-toothless gear 91 is stopped by a restrict portion not illustrated and moved by the electromagnetic solenoid in a state in which a tooth-chipped portion faces a gear rotated by a motor. One of the spur gears of the partially-toothless gear 91 is urged toward the gear not illustrated. The restrict portion moves every time when a trigger is inputted to the electromagnetic solenoid and a gear portion of the urged spur gear engages with the gear not illustrated. As one of the spur gears rotates, the other spur gear rotates and a gear portion of the other spur gear engages with the gear not illustrated. Then, the partially-toothless gear 91 rotates once and the conveyance roller 72 and the pickup roller 71 rotate by the rotation of the partially-toothless gear 91. The restrict portion restricts the partially-toothless gear 91 again such that the partially-toothless gear 91 is stopped after rotating once.

Lifting and Lowering Control Mechanism

Figure 3:
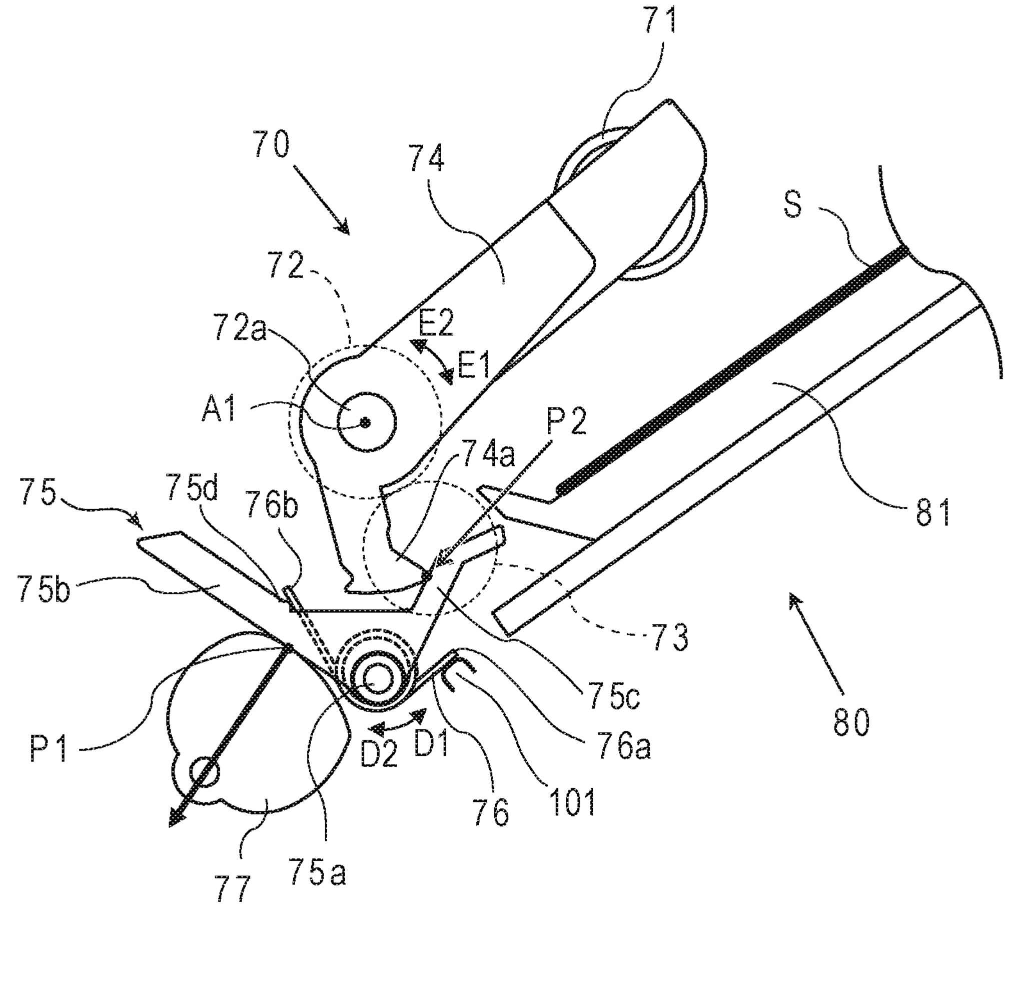
FIG. 3 is a diagram illustrating an operation of a swing arm of the embodiment.
Figure 4:
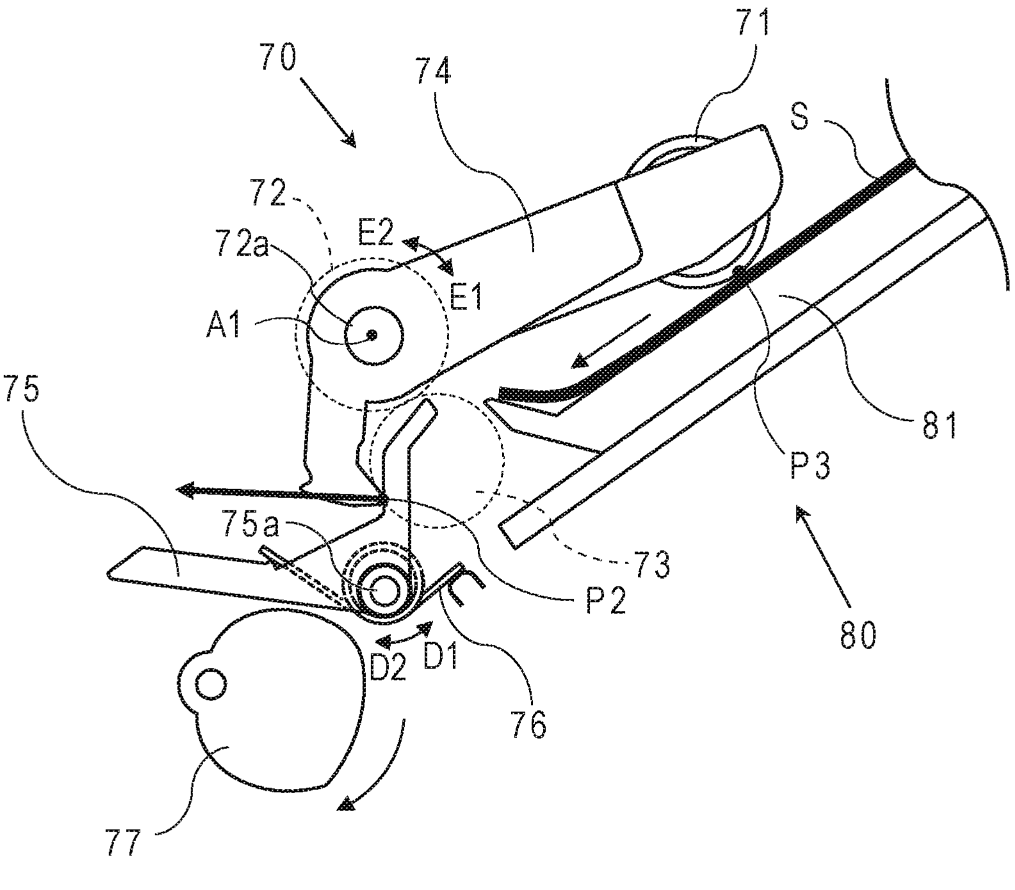
FIG. 4 is another diagram illustrating the operation of the swing arm of the embodiment.

Next, a configuration of a lifting and lowering control mechanism for lifting and lowering the pickup roller 71 will be described with reference to FIGS. 2 through 4. FIGS. 3 and 4 are schematic diagrams illustrating a part of the sheet feeding apparatus 70 when viewed in a rotation axis direction X of the pickup roller 71, i.e., in a nip width direction of the separation nip or a sheet width direction (see FIG. 2). FIG. 3 illustrates a state in which the pickup roller 71 is positioned at the separate position and FIG. 4 illustrates a state in which the pickup roller 71 is positioned at the feed position.

As illustrated in FIG. 2, the sheet feeding apparatus 70 includes a cam 77 serving as a restrict member, a pressurizing spring 76 and a pressurizing lever 75 as the lifting/lowering mechanism. The cam 77 is provided coaxially with the partially-toothless gear 91 and rotates together with the partially-toothless gear 91.

As illustrated in FIGS. 2 and 3, the pressurizing lever 75 serving as a transmitting portion or a transmission member of the present embodiment is supported by the apparatus body 1A and is pivotable centering on a shaft portion 75*a* approximately parallel with the feed roller shaft 72*a*. In other words, the pressurizing lever 75 is pivotable centering on an axis different from an axial line A1 which is a center line of the feed roller shaft 72*a* and is also a swing axis of the swing arm 74. The pivot axis of the pressurizing lever 75 is substantially parallel with the axial line A1. The pressurizing lever 75 incudes a cam contact portion 75*b* which comes into contact with a cam surface, i.e., an outer circumferential surface, of the cam 77 and an arm contact portion 75*c* which comes into contact with a project portion 74*a* which is a contact portion of the swing arm 74. The pressurizing lever 75 is configured to be swung, i.e., movable, in D1 and D2 directions as indicated in FIG. 3. By being in contact with the cam contact portion 75*b* of the pressurizing lever 75, the cam 77 is configured to move between a restrict position where the cam 77 restricts a position of the pressurizing lever 75 urged by the pressurizing spring 76 and a release position where the cam 77 retracts or recedes from, i.e., releases the restrict position. When the cam 77 is positioned at the release position, the cam 77 separates from the cam contact portion 75*b* of the pressurizing lever 75 in the present embodiment.

Figure 6:
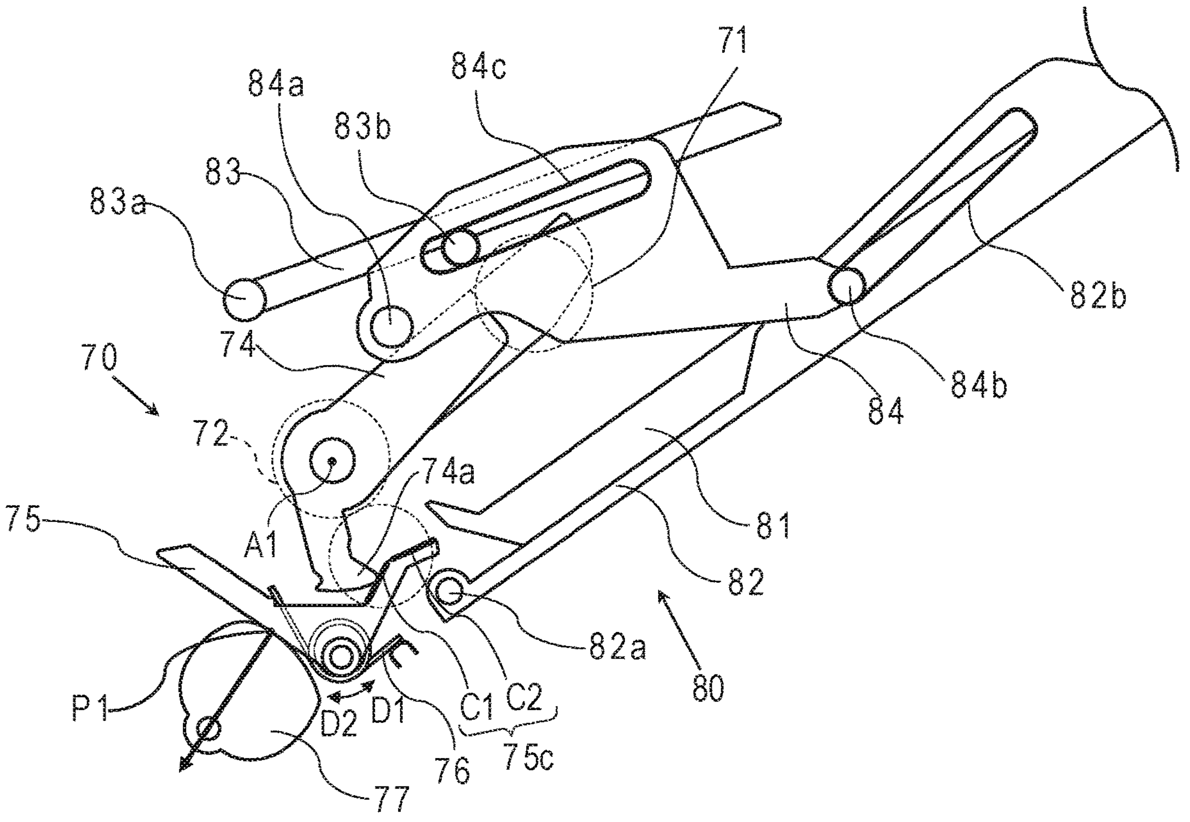
FIG. 6 is a diagram illustrating a state in which the door unit of the embodiment is at an open position.

It is noted that the arm contact portion 75*c* of the pressurizing lever 75 includes a first surface C1 and a second surface C2 each abuttable with a project portion 74*a* of the swing arm 74 (see FIG. 6). Operations of the first surface C1 and the second surface C2 will be described later.

The pressurizing spring 76 serving as an urging portion or an urging member of the present embodiment has a function of urging the swing arm 74 to the feed position through the pressurizing lever 75 by urging the pressurizing lever 75 in a predetermined pivot direction. A torsion coil spring attached around a shaft portion 75*a* of the pressurizing lever 75 is used as the pressurizing spring 76 in the present embodiment. One end portion 76*a* of the pressurizing spring 76 is attached to a spring hook portion 101 and another end portion 76*b* is attached to a spring hook portion 75*d* of the pressurizing lever 75. The pressurizing spring 76 generates a force of rotating the pressurizing lever 75 in a D1 direction, i.e., counterclockwise in FIG. 3. The pressurizing spring 76 generates a force of rotating the pressurizing lever 75 in a direction in which a cam contact portion 75*b* of the pressurizing lever 75 approaches the cam 77.

Among swing directions of the swing arm 74, a swing direction in which the pickup roller 71 is moved, i.e., is lowered, from the separate position to the feed position, i.e., a first direction, will be referred to as an E1 direction hereinafter. A swing direction in which the pickup roller 71 is moved, i.e., is lifted, from the feed position to the separate position, i.e., in a second direction opposite to the first direction, will be referred to as an E2 direction. In other words, the E1 direction is a direction in which the pickup roller 71 approaches the stacking tray 81 and the E2 direction is a direction in which the pickup roller 71 is separated away from the stacking tray 81.

The door unit 80 is positioned at the open position and the cam 77 is positioned at the restrict position before starting the sheet feeding operation. As illustrated in FIG. 3, the pickup roller 71 is held at the separate position and is spaced away from the stacking tray 81 and the sheet S before starting the sheet feeding operation. In this state, the cam 77 is in contact with the pressurizing lever 75 at a point P1 and the pressurizing lever 75 is in contact with the swing arm 74 at a point P2, so that the position of the swing arm 74 is held. That is, the cam 77 holds (or catches) the pressurizing lever 75, which is urged in the D1 direction by the pressurizing spring 76, by coming into contact with the cam contact portion 75*b* of the pressurizing lever 75 at the point P1, so that the pressurizing lever 75 is held. Still further, the swing arm 74 is urged in the E2 direction by a swing arm urging spring, i.e., own weight canceling spring, not illustrated. The project portion 74*a* of the swing arm 74 comes into contact with an arm contact portion 75*c*, i.e., a first surface C1 in FIG. 6, of the pressurizing lever 75 in this state, so that the swing arm 74 is positioned at the separate position.

It is noted that the force of the swing arm urging spring is set at a value slightly greater than a force by which the swing arm 74 tries to pivot in the E1 direction by the own weight of the swing arm 74 and by weights of members supporting the swing arm 74. A moment of force in the E2 direction acting on the swing arm 74 is sufficiently smaller than a maximum value of a moment of force in the E1 direction to be exerted on the swing arm 74 by the pressurizing spring 76. Therefore, the pressurizing lever 75 will not pivot in the D2 direction from the position in FIG. 3 and holds the swing arm 74 at the position in FIG. 3 against the urging force of the swing arm urging spring in a state in which the pressurizing lever 75 is in contact with the cam 77 at the point P1. A user can readily set the sheet S on the stacking tray 81 because the pickup roller 71 is thus held at the separate position.

When the sheet S is fed, the door unit 80 is positioned at the open position and the cam 77 is positioned at the release position, so that the cam 77 separates from the pressurizing lever 75. In this state, the pressurizing lever 75 urges the swing arm 74 in the E1 direction. As illustrated in FIG. 4, when the sheet feeding operation starts, the pickup roller 71 moves from the separate position to the feed position and comes into contact with the sheet S on the stacking tray 81. That is, the partially-toothless gear 91 (see FIG. 2) starts to rotate as a trigger is inputted to the electromagnetic solenoid as described above in starting the sheet feeding operation. Then, the cam 77 rotates clockwise in FIG. 4 together with the partially-toothless gear 91 and the cam surface of the cam 77 recedes from the cam contact portion 75*b* of the pressurizing lever 75. Then, the pressurizing lever 75 pivots in the D1 direction, i.e., counterclockwise in FIG. 4, by the urging force of the pressurizing spring 76. Along with the pivot of the pressurizing lever 75 in the D1 direction, the project portion 74*a* of the swing arm 74 is pressed by the arm contact portion 75*c*, i.e., by the first surface C1 in FIG. 6, so that the swing arm 74 swings in the E1 direction. Then, as the pickup roller 71 comes into contact with the sheet S, the swinging of the swing arm 74 in the E1 direction stops. The cam surface of the cam 77 separates from the pressurizing lever 75 in the process in which the swing arm 74 swings in the E1 direction.

As illustrated in FIG. 4, the pressurizing lever 75 is urged in the D1 direction by the urging force of the pressurizing spring 76 and the arm contact portion 75*c*, i.e., the first surface C1, of the pressurizing lever 75 comes into contact with the project portion 74*a* of the swing arm 74 at a point P2 in the state in which the pickup roller 71 is in contact with the sheet S. The swing arm 74 is urged in the E1 direction and a pressurizing force, by which the pickup roller 71 comes into contact with the sheet S, is generated at a point P3 by the force of the pressurizing lever 75 pressing the swing arm 74. In other words, because the urging force of the pressurizing spring 76 serving as the urging portion is transmitted to the swing arm 74 serving as the lift member through the pressurizing lever 75 serving as the transmitting portion, an adequate feed pressure of the pickup roller 71, i.e., the feed roller, is assured. It is noted that the moment of force in the E2 direction acting on the swing arm 74 by the swing arm urging spring is smaller than the moment of force in the E1 direction acting on the swing arm 74 by the pressurizing spring 76. The urging force of the pressurizing spring 76 is set such that the pickup roller 71 can come into contact with S with an adequate pressure, against the urging force of the swing arm urging spring.

In parallel with the move of the pickup roller 71 to the feed position, the pickup roller 71 and the conveyance roller 72 rotate as a drive is transmitted through the gear train described above and one sheet S is fed from the stacking tray 81. After that, the cam 77 comes into contact with the pressurizing lever 75 again and the pressurizing lever 75 pivots in the D2 direction. The swing arm 74 swings in the E2 direction by the force of the swing arm urging spring and the pickup roller 71 returns from the feed position to the separate position. Thus, the pressurizing lever 75 serving as the transmitting portion is configured to, along with the rotation of the cam 77, move the moving member (i.e., the swing arm 74) in the first direction (i.e., in the E1 direction) such that the feed roller (i.e., the pickup roller 71) comes into contact with the sheet on the stacking portion, and then move the moving member in the second direction (i.e., in the E2 direction) such that the feed roller separates from the sheet on the stacking portion. Then, as the cam 77 completes the rotation thereof, the sheet feeding apparatus 70 returns to the state as illustrated in FIG. 3.

Door Unit

Figure 5:
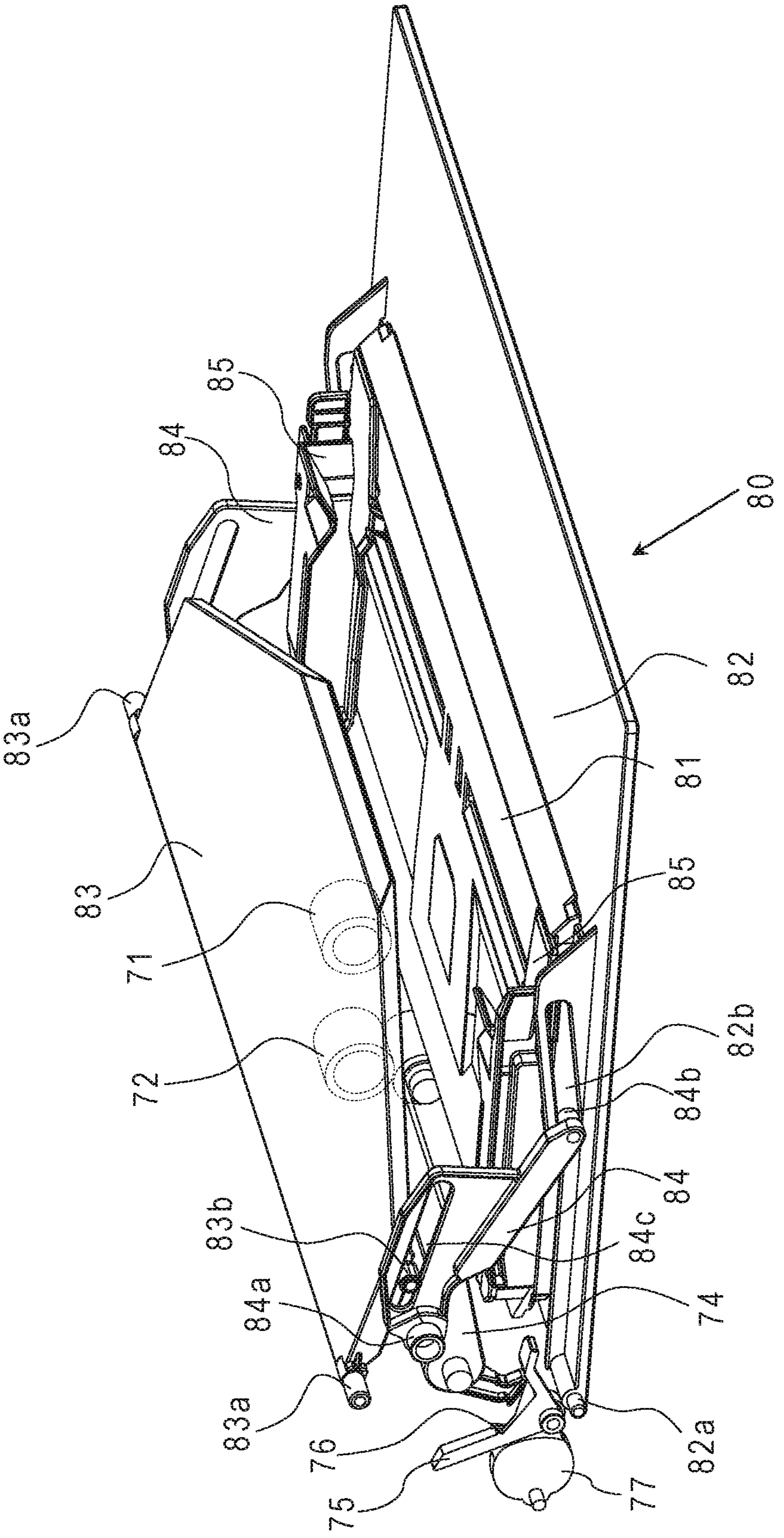
FIG. 5 is a perspective view illustrating a vicinity of a door unit and the swing arm of the embodiment.

Opening and closing operations of the door unit 80 and operations of the swing arm 74 linked with the operation of the door unit 80 of the present embodiment will be described below with reference to FIGS. 5 through 9. FIG. 5 is a perspective view illustrating a vicinity of the door unit 80 and the swing arm 74.

The door unit 80 serving as the opening/closing unit of the present embodiment includes the stacking tray 81, a door member 82, a cover member 83 and door links 84. The stacking tray 81 is configured to move together with the door member 82 and moves with respect to the apparatus body 1A in linkage with the opening and closing operation of the door member 82. The stacking tray 81 includes width regulating members 85 configured to regulate a sheet widthwise position of the sheet S and is supported by the door member 82. The door member 82 turns or pivots centering on a fulcrum 82*a* supported by the apparatus body 1A (see FIG. 1). A turning axis of the door member 82 is substantially parallel with the swing axis of the swing arm 74. A moving direction of the width regulating member 85 is substantially parallel with the turning axis of the door member 82. As described later, the stacking tray 81 has a function as a displacement member, i.e., a pressing member, of moving the swing arm 74 of the moving unit in the E2 direction in closing the door unit 80, i.e., the door member 82.

The cover member 83 has a function as a displacement member of moving the swing arm 74 of the moving unit in the E1 direction in opening the door unit 80, i.e., in opening the door member 82. In terms of the moving direction of the door unit 80, i.e., the moving direction of the door member 82, in closing the door unit 80, i.e., in closing the door member 82, the stacking tray 81 is positioned upstream of the pickup roller 71. The stacking tray 81 is also positioned upstream of the pickup roller 71 in terms of the E2 direction. The cover member 83 is positioned upstream of the pickup roller 71 in terms of the moving direction of the door unit 80, i.e., the moving direction of the door member 82, in opening the door unit 80, i.e., in opening the door member 82. The cover member 83 is positioned upstream of the pickup roller 71 in terms of the E1 direction.

In a state in which the door unit 80 is opened to the predetermined open position as illustrated in FIG. 1, the stacking tray 81, the door member 82 and the cover member 83 project outside of the side surface 1S of the apparatus body 1A. Further, in a state in which the door unit 80 is opened to the open position, the swing arm 74 and the pickup roller 71 project outside of the side surface 1S of the apparatus body 1A. In the state in which the door unit 80 is positioned at the open position, the stacking tray 81 is exposed and allows the sheet S to be stacked on the stacking tray 81. In this state, the sheet feeding apparatus 70 can feed the sheet S from the stacking tray 81. Meanwhile, in a case where the door unit 80 is moved to the closed position, the stacking tray 81, the cover member 83, the pickup roller 71 and others are stored inside of the apparatus body 1A, i.e., within a space secured between the door member 82 and the apparatus body 1A. That is, the stacking tray 81 is stored between the door member 82, i.e., a part of the door unit 80, and the apparatus body 1A in the state in which the door unit 80 is positioned at the closed position. The closed position (or storage position) of the door unit 80 is a position where the door member 82 is turned counterclockwise in FIG. 1 from the open position in FIG. 1.

In a case where the door unit 80 is positioned at the closed position, an outside surface, i.e., a lower right side surface in FIG. 1, of the door member 82 forms the side surface of the image forming apparatus 1 together with the side surface 1S of the apparatus body 1A in the present embodiment. Still further, in a case where the door unit 80 is positioned at the closed position, the outside surface of the door member 82 is paralleled with the side surface 1S of the apparatus body 1A in the present embodiment. The position of the door member 82 when the door unit 80 is positioned at the closed position is referred to as a closed position of the door member 82 and the position of the door member 82 when the door unit 80 is positioned at the open position is referred to as an open position of the door member 82. When the door unit 80 is positioned at the closed position and the door member 82 is positioned at the closed position, the outside surface of the door member 82 is positioned flush with the side surface 1S of the apparatus body 1A in the present embodiment. As it will be understood from FIG. 1, at least a part of the cover member 83, at least a part of the swing arm 74 and the pickup roller 71 are positioned outside of the apparatus body 1A with respect to the closed position of the door member 82 when the door unit 80 is positioned at the open position.

As illustrated in FIG. 5, the cover member 83 is disposed so as to cover at least a part of, or preferably the entirety of, the pickup roller 71 and the swing arm 74 when viewed from an upper side in the direction of gravity. The cover member 83 turns centering on a fulcrum 83*a* supported by the apparatus body 1A.

The door links 84 each include a link shaft 84*b* and a guide groove 84*c* to link the door member 82 and the cover member 83. Specifically, the link shaft 84*b* engages with a guide groove 82*b* of the door member 82 and the guide groove 84*c* engages with a link shaft 83*b* of the cover member 83. Still further, each door link 84 turns centering on a fulcrum 84*a* supported by the apparatus body 1A. When the door member 82 turns, the link shaft 84*b* slides within the guide groove 82*b* such that the door link 84 turns in linkage with the door member 82. Still further, along with the turn of the door link 84, the link shaft 83*b* slides within the guide groove 82*b* such that the cover member 83 turns in linkage with the door link 84. In other words, the cover member 83 turns in linkage with the door member 82. In short, each door link 84 functions as a link member of moving the cover member 83 in linkage with the door member 82.

The door links 84 and the fulcrums 82*a*, 83*a* and others are provided on both sides in the sheet width direction even though a part thereof is not illustrated in the perspective view of FIG. 5. Still further, the width regulating members 85 are omitted in FIGS. 6 through 8 used in the following description.

Operation in Closing Door Unit

Figure 7:
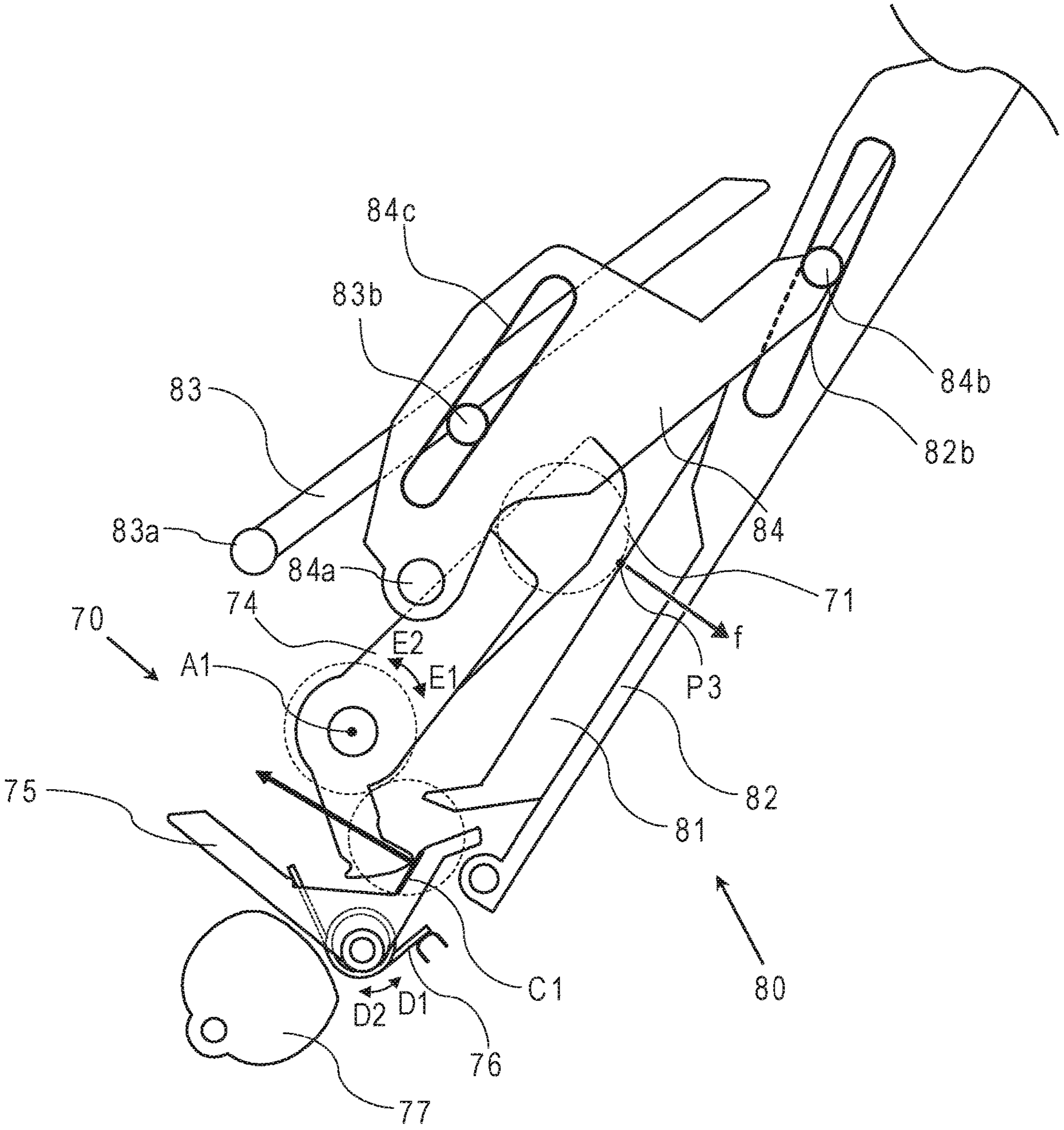
FIG. 7 is a diagram illustrating a state in which the door unit of the embodiment is on a way of moving from the open position to a closed position.
Figure 8:
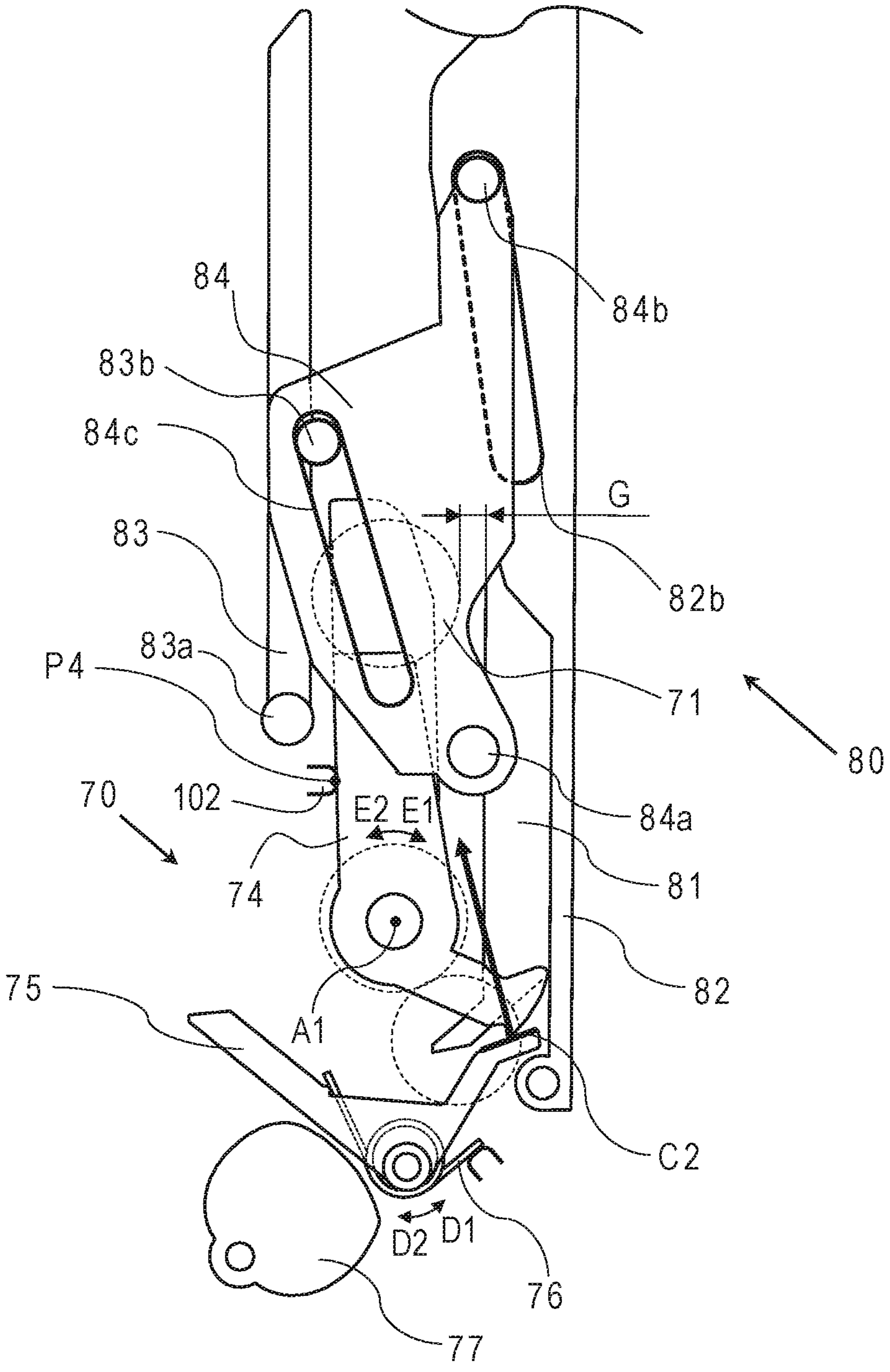
FIG. 8 is a diagram illustrating a state in which the door unit of the embodiment is at the closed position.

Operations in closing or storing the door unit 80 will be described below with reference to FIGS. 6 through 8. All of FIGS. 6 through 8 are side views when the sheet feeding apparatus 70 is viewed in the sheet width direction, i.e., in the rotation axis direction X of the pickup roller 71. FIG. 6 illustrates a state in which the door unit 80 is positioned at the open position. In a case where no sheet feeding operation is performed, the pickup roller 71 is positioned at the separate position and the cam 77 bears the urging force of the pressurizing spring 76 at the point P1 as described above. When the user grasps the door member 82 and pushes up the door unit 80, the door member 82 turns upward centering on the fulcrum 82*a* and the stacking tray 81 approaches the pickup roller 71.

The door unit 80 is configured to, in moving from the open position to the closed position, press the pickup roller 71 of the moving unit against the urging force of the pressurizing lever 75 so that the swing arm 74 swings in the E2 direction. FIG. 7 illustrates a state in which the pickup roller 71 comes in contact with the stacking tray 81 at the point P3 and the swing arm 74 starts to swing upward from the separate position as the user pushes up the door unit 80 further. In this state, the door unit 80 is located between the open position and the closed position and the pickup roller 71 of the moving unit is in contact with the door unit 80. Then, the pressurizing lever 75 urges the swing arm 74 in the E1 direction. Because the pickup roller 71 is pressed by the stacking tray 81 of the door unit 80, the swing arm 74 pivots in the E2 direction. The swing arm 74 comes into contact with the first surface C1 of the arm contact portion 75*c*, so that the pressurizing lever 75 pivots in the D2 direction. Then, the pressurizing lever 75 is separated from the cam 77 and the urging force of the pressurizing spring 76 (see FIG. 6) that has been received by the cam 77 acts on the swing arm 74 as a force against the pivot of the swing arm 74 in the E2 direction through the first surface C1. In other words, the swing arm 74 receives the urging force of the pressurizing spring 76 as a force against the pivot of the swing arm 74 in the E2 direction, i.e., as a force of urging the swing arm 74 in the E1 direction, through the first surface C1 of the pressurizing lever 75. It is noted that the door unit 80 may be configured so as to press a part other than the pickup roller 71 in the moving unit, e.g., the swing arm 74. Still further, the door unit 80 may be configured such that a part other than the stacking tray 81 in the door unit 80, e.g., the door member 82, presses the moving unit.

Because the swing arm 74 is urged in the E1 direction by the urging force of the pressurizing spring 76, the pickup roller 71 supported by the swing arm 74 pushes back the stacking tray 81 in a direction opposite to the lift up direction of the door unit 80 at the point P3. That is, in a process of closing the door unit 80, a force f of the urging force of the pressurizing spring 76 that presses the door unit 80 in an opening direction thereof is applied to the door unit 80 through the pressurizing lever 75, the swing arm 74 and the pickup roller 71.

FIG. 8 illustrates a state in which the door unit 80 has moved to the closed position. In the state in which the door unit 80 is held at the closed position, the pickup roller 71 and the swing arm 74 of the moving unit are located at positions separated from the door unit 80. After the door unit 80 is moved from the position illustrated in FIG. 7 and before the door unit 80 reaches the closed position, the contact position of the pressurizing lever 75 and the swing arm 74 changes from the first surface C1 to the second surface C2. The second surface C2 is formed such that the swing arm 74 is urged in the E2 direction by the urging force of the pressurizing spring 76 transmitted to the swing arm 74 through the second surface C2. As the swing arm 74 is urged in the E2 direction, the swing arm 74 comes into contact with the cover member 83 and the door unit 80 is urged toward the closed position. The swing arm 74 urges the cover member 83 until the swing arm 74 comes into contact with the stopper 102 described later. In the state in which the door unit 80 is held at the closed position, the swing arm 74 receives the urging force of the pressurizing spring 76 as a force of urging the swing arm 74 in the E2 direction through the second surface C2 of the pressurizing lever 75.

Here, the second surface C2 extends with an angle different from that of the first surface C1 when viewed in the direction of the swing axis of the swing arm 74. The change of the directions of the urging force of the pressurizing spring 76 acting on the swing arm 74 along with the closing operation (or storing operation) of the door unit 80 may be expressed as follows. That is, in a case of viewing in the direction of the axial line A1 which is the swing axis of the swing arm 74, a normal vector of the first surface C1 in contact with the swing arm 74 in the state in FIG. 7 illustrating a state on a way of the closing operation passes through one side of the axial line A1. Still further, a normal vector of the second surface C2 which is in contact with the swing arm 74 in a state of FIG. 8 illustrating a state in which the door unit 80 arrives at the closed position passes through another side of the axial line A1. That is, in the state in which the swing arm 74 is in contact with the first surface C1, the swing arm 74 is urged in the E1 direction by the pressurizing lever 75. In the state in which the swing arm 74 is in contact with the second surface C2, the swing arm 74 is urged in the E2 direction by the pressurizing lever 75.

Thus, the directions in which the urging force of the pressurizing spring 76 acts on the swing axis of the swing arm 74 change by changing the contact positions of the swing arm 74 and the pressurizing lever 75 in linkage with the closing operation of the door unit 80. As a result, the door unit 80 receives the force f (see FIG. 7) from the swing arm 74 through the pickup roller 71 in the process of the closing operation of the door unit 80. In contrast, in the state in which the door unit 80 is positioned at the closed position (see FIG. 8), the pickup roller 71 is separated from the door unit 80 and the door unit 80 receives no force in the opening direction from the swing arm 74. That is, the force that the door unit receives 80 from the moving unit in the state in which the door unit 80 is at the closed position is smaller than a maximum value of the force f that the door unit 80 receives from the moving unit during the closing operation of the door unit 80.

It is noted that in the state in which the door unit 80 is positioned at the closed position, the pickup roller 71 separates from the stacking tray 81. In addition, in the state in which the door unit 80 is positioned at the closed position, the pickup roller 71 and the swing arm 74 also separate from the cover member 83. It is noted that in the state in which the door unit 80 is positioned at the closed position, the moving unit may be in contact with the cover member 83. The apparatus body 1A is provided with the stopper 102 that restricts the swing arm 74 from pivoting in the E2 direction. Because the swing arm 74 comes into contact with the stopper 102 at a point P4 in the state in which the door unit 80 is positioned at the closed position, the swing arm 74 is positioned in a state in which a gap G is secured between the pickup roller 71 and the stacking tray 81. That is, in the state in which the door unit 80 is positioned at the closed position, the stopper 102 provided on the apparatus body 1A bears the urging force of the pressurizing spring 76. Because the stopper 102 holds (or catches) the swing arm 74, it is possible to arrange such that the urging force of the swing arm 74 acts on the stopper 102 and such that no urging force acts on the cover member 83.

Operations in Opening Door Unit

Figure 9:
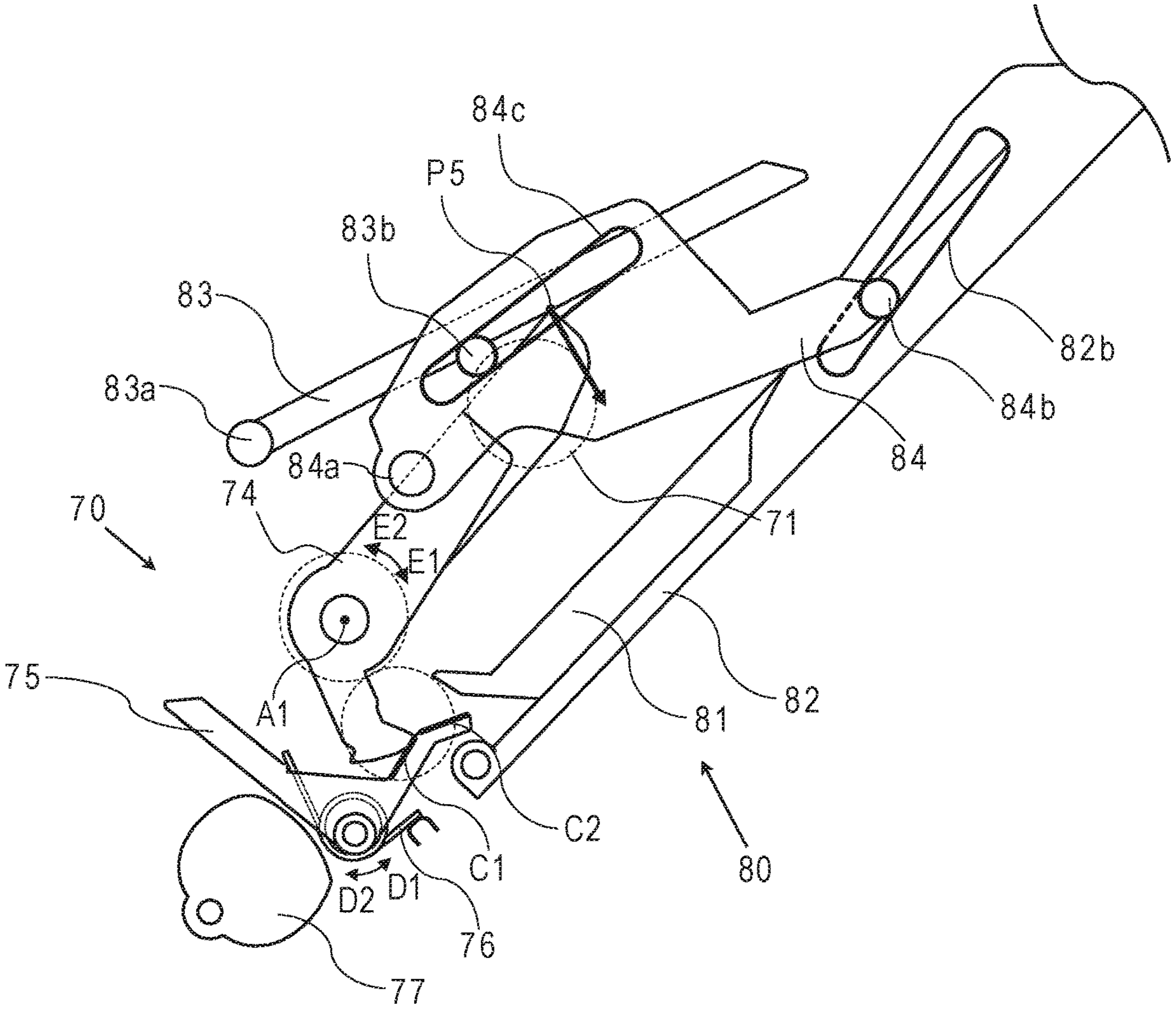
FIG. 9 is a diagram illustrating a state in which the door unit of the embodiment is on a way of moving from the closed position to the open position.

An operation in opening the door unit 80 will be described below. FIG. 9 illustrates a process of the opening operation of the door unit 80. When the user presses down the door unit 80 from the closed position as illustrated in FIG. 8, the cover member 83 also turns downward in linkage with that operation through the door link 84. Then, as the cover member 83 comes into contact with the swing arm 74 at a point P5, the swing arm 74 pivots in the E1 direction centering on the axial line A1. In the state in which the door unit 80 is positioned at the closed position, the swing arm 74 is urged in the E2 direction by the urging force of the pressurizing spring 76 by being in contact with the second surface C2 of the pressurizing lever 75 as described above. Accordingly, the swing arm 74 starts to swing in the E1 direction against the urging force in the E2 direction of the pressurizing spring 76 by being pressed by the cover member 83. Thus, the door link 84 and the cover member 83 function as a linkage mechanism that causes the swing arm 74 to swing in the E1 direction in linkage with the opening operation of the door unit 80.

If the swing arm 74 swings by a certain amount, the contact position of the swing arm 74 and the pressurizing lever 75 changes from the second surface C2 to the first surface C1 as illustrated in FIG. 9. When the swing arm 74 comes into contact with the pressurizing lever 75 on the first surface C1, the swing arm 74 rotates in the E1 direction and separates from the cover member 83 and the pressurizing lever 75 rotates in the D1 direction and comes into contact with the cam 77. Then, the swing arm 74 moves to the separate position and the sheet feeding apparatus 70 returns to the state as illustrated in FIG. 6. In the state in which the swing arm 74 is in contact with the first surface C1 of the pressurizing lever 75, the urging force of the pressurizing spring 76 acts as a force of rotating the swing arm 74 in the E1 direction. Accordingly, by opening the door unit 80 to the open position, the sheet feeding apparatus 70 is put into a state in which the swing arm 74 can execute the sheet feeding operation of lifting and lowering the pickup roller 71 along with the rotation of the cam 77 as described above with reference to FIGS. 3 and 4.

It is noted that the cover member 83 and the swing arm 74 are configured so as not to come into contact even if the swing arm 74 is lifted up in the state in which the door unit 80 is positioned at the open position (see FIG. 6). Therefore, even if the swing arm 74 is lifted up in feeding the sheet, no impact sound otherwise caused by the swing arm 74 and the cover member 83 is generated. Still further, the cover member 83 does not act on the swing arm 74 in the process of moving the door unit 80 from the open position to the closed position.

Advantages of Present Embodiment

Figure 10A:
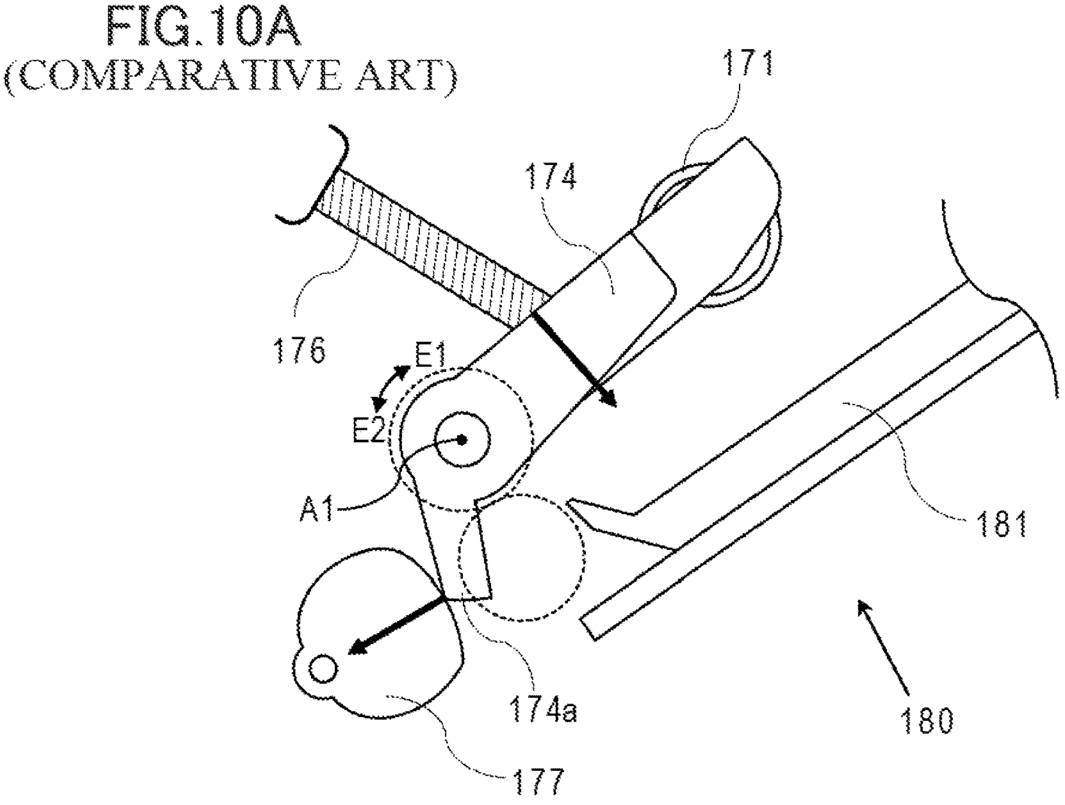
FIG. 10A is a schematic diagram illustrating a configuration of a sheet feeding apparatus of a comparative example.

Advantageous points of the present embodiment will be described below while comparing with a comparative example illustrated in FIGS. 10A and 10B. The comparative example is different from the present embodiment in that a swing arm 174 is urged directly by a pressurizing spring 176. That is, as illustrated in FIG. 10A, the pressurizing spring 176 is directly connected with the swing arm 174 and applies urging force in an E1 direction to the swing arm 174 around an axial line A1. In a case where a door unit 180 is positioned at an open position and no sheet feeding operation is performed, a project portion 174*a* of the swing arm 174 comes into contact with a cam 177 and the urging force of the pressurizing spring 176 is borne by the cam 177, so that the swing arm 174 is held at the separate position.

Figure 10B:
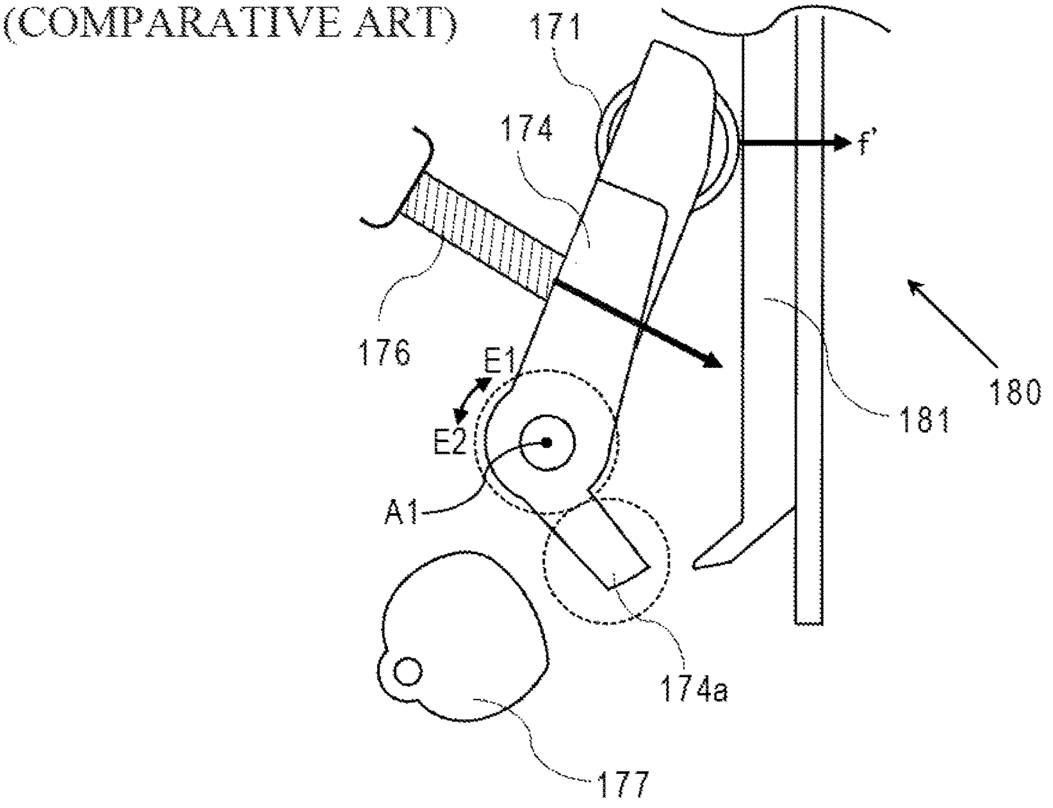
FIG. 10B is a schematic diagram illustrating the configuration of the sheet feeding apparatus of the comparative example.

As the user lifts up the door unit 180 from the open position to the closed position, the swing arm 174 swings in an E2 direction because a stacking tray 181 of the door unit 180 comes into contact with the pickup roller 171 as illustrated in FIG. 10B. At this time, a deformation amount of the pressurizing spring 176 increases along with the swing in the E2 direction of the swing arm 174 and a contact pressure of the pickup roller 171 and the stacking tray 181 increases. As a result, a force f' pressing the door unit 180 in the opening direction applied from the swing arm 174 to the door unit 180 reaches a maximum value in a state in which the door unit 180 is positioned at the closed position.

Such force f' may cause a creep deformation on component members of the door unit 180 in the state in which the door unit 180 is stored at the closed position. Because the door unit 180 is held at the closed position such that an outside shape of the image forming apparatus 1 is minimized in a packaged state in transporting a product in general, there is concern that a creep deformation is generated in the packaged state. In addition to the force f' described above, the image forming apparatus 1 in the packaged state is liable to cause a creep deformation if it is left in a high temperature environment for a long period of time.

Rigidity of the opening/closing unit such as the door unit 180 is often low as compared to that of the apparatus body. It is because while a highly strong member is often used as a frame member of the apparatus body 1A, the door unit which is an openable structure is often limited in terms of material and size of a member used as the door unit from an aspect of down-sizing, lightening of weight and others. Therefore, if the door unit 180 is constructed by a highly rigid member so as not to cause deformation of the door unit 180 in the comparative example described above, it leads to an increase of cost and an increase of size of the image forming apparatus.

In contrast to that, according to the present embodiment, the contact position of the pressurizing lever 75 and the swing arm 74 changes in the process in which the door unit 80 moves from the open position to the closed position as described above. Then, the force received by the door unit 80 from the swing arm 74 in the state in which the door unit 80 is positioned at the closed position is smaller than the maximum value of the force f received by the door unit 80 from the swing arm 74 in the closing operation of the door unit 80. This arrangement makes it possible to suppress the door unit 80, for which rigidity higher than that of the apparatus body 1A is hard to be assured, from being deformed. Still further, it is possible to suppress the door unit 80 from being opened by the force acting on the door unit 80 from the moving unit against an intention of the user.

Still further, according to the present embodiment, the urging force of the pressurizing spring 76 transmitted to the swing arm 74 through the pressurizing lever 75 is borne or received by the stopper 102 (see FIG. 8) in the state in which the door unit 80 is positioned at the closed position. It is possible to suppress the door unit 80 from generating the creep deformation otherwise caused by the urging force of the pressurizing spring 76 in the packaged state or the like by receiving the urging force of the pressurizing spring 76 by the structure of the side of the apparatus body for which high rigidity can be assured.

Still further, according to the present embodiment, the swing arm 74 is arranged to move to the separate position by the cover member 83 that is linked with the door unit 80 in a case where the door unit 80 moves from the closed position to the open position. Differing from the storage tray type sheet feeding apparatus, the manual tray type sheet feeding apparatus is often disposed at a position exposed outside of the body of the image forming apparatus. Therefore, the lifting and lowering operation of the swing arm 74 in feeding sheets is visible for the user, and there is a possibility that the user unintentionally touches the swing arm 74. Because the cover member 83 of the present embodiment is disposed so as to cover the swing arm 74 and the pickup roller 71 from above, it is possible to reduce such unintentional touch of the user by making it hard to see the lifting and lowering operation of the swing arm 74 in feeding the sheet in addition to the operations described above.

MODIFIED EXAMPLES

It is noted that according to the present embodiment, the swing arm 74 is urged in the E2 direction, not in the E1 direction, by the pressurizing spring 76 and the door unit 80 receives no force from the swing arm 74, i.e., the force received by the door unit 80 from the swing arm 74 is zero, in the state in which the door unit 80 is held at the closed position. However, another structure may be adopted as long as the force received by the door unit 80 from the swing arm 74 in the state in which the door unit 80 is held at the closed position is smaller than the maximum value of the force f received by the door unit 80 from the swing arm 74 in the process of the closing operation of the door unit 80. That is, even if the door unit 80 is held at the closed position and the pickup roller 71 is in contact with the door unit 80, it is permissible if the urging force of the pickup roller 71 is sufficiently smaller than the maximum value of the force f. For instance, even if the pressurizing lever 75 urges the swing arm 74 in the E1 direction by the urging force of the pressurizing spring 76 in the state in which the door unit 80 is held at the closed position, it is permissible if the urging force is sufficiently smaller than the maximum value of the force f.

It is noted that the pickup roller 71 and the swing arm 74 may be brought into contact with the cover member 83 and may urge the cover member 83 in a direction in which the door unit 80 is closed in the state in which the door unit 80 is held at the closed position. At this time, it is preferable to arrange such that a part of the apparatus body 1A is brought into contact with the cover member 83 to hold the cover member 83 by the apparatus body 1A. This arrangement makes it possible to suppress the door unit 80 from being opened by the force received from the moving unit. At this time, the urging force received by the cover member 83 is preferable to be smaller than the maximum value of the force f received by the door unit 80 from the swing arm 74 in the process of the closing operation of the door unit 80.

Still further, a tensile spring, a compression spring, a leaf spring or the like may be used as the pressurizing spring 76 serving as the urging portion, besides the torsion coil spring, so as to generate a similar force of the pressurizing spring 76. The urging portion may be also integrally formed with the pressurizing lever 75. For instance, a leaf spring integrally formed with the pressurizing lever 75 may be used as the urging portion.

Still further, while the present embodiment has been described such that the stopper 102 (see FIG. 8) bears the urging force of the pressurizing spring 76 in the state in which the door unit 80 is held at the closed position, it is possible to arrange such that the urging force of the pressurizing spring 76 is borne by the cam 77. That is, in a case where the stopper 102 is omitted, the pressurizing lever 75 pivots slightly in the D1 direction from the position as illustrated in FIG. 8 and comes into contact with the cam 77. Because the urging force by which the pressurizing lever 75 is urged in the D1 direction by the pressurizing spring 76 is received by the cam 77 in this state, the urging force of the pressurizing spring 76 does not transmit to the swing arm 74. That is, the restrict member, i.e., the cam 77, not the stopper 102 which is the part of the apparatus body, holds the transmitting portion, i.e., the pressurizing lever 75, in the state in which the opening/closing unit, i.e., the door unit 80, is positioned at the closed position.

Still further, while the stacking tray 81 is a component integrated with the door member 82 in the present embodiment, the stacking tray 81 may be configured so as to move with respect to the frame member of the opening/closing unit such as the door member 82.

Still further, the member of pushing up the swing arm 74 when the door unit 80 is moved from the open position to the closed position is not limited to be the stacking tray 81 and a part of the door unit 80, e.g., the door member 82, may push up the swing arm 74. Still further, the present embodiment has been arranged such that a part of the door unit 80 comes into contact with the pickup roller 71 to push up the swing arm 74. However, the part of the door unit 80 may be arranged so as to come into contact with the swing arm 74 or other member(s) integrated with the swing arm 74 to push up the swing arm 74.

Still further, the swing arm 74 is linked with the door unit 80 by the mechanism including the door link 84 and the cover member 83 in a case where the door unit 80 moves from the closed position to the open position in the present embodiment, another link structure may be used. For instance, it is possible to arrange such that the swing arm 74 is linked with one end of the link member and the door unit 80 is linked with another end of the link member to link the swing arm 74 with the opening operation of the door unit 80.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-179583, filed on Oct. 27, 2020, and No. 2021-075791, filed on Apr. 28, 2021, which are hereby incorporated by reference herein in their entirety.

What is claimed is:

1. A sheet feeding apparatus comprising:

an opening/closing unit including a stacking portion on which a sheet is stacked, and configured to be opened and closed between an open position and a closed position with respect to an apparatus body of the sheet feeding apparatus;

a moving unit including a feed roller configured to feed the sheet and a moving member supporting the feed roller, the moving member being movable with respect to the stacking portion in a first direction in which the feed roller approaches the stacking portion and in a second direction opposite to the first direction;

an urging portion; and a transmitting portion including a contact configured to contact the moving unit, the transmitting portion configured to (i) be urged by the urging portion and (ii) transmit urging force of the urging portion to the moving member to urge the moving member in the first direction;

wherein the opening/closing unit is configured to press and move the moving unit in the second direction against the urging force while the opening/closing unit moves from the open position to the closed position, and wherein a force that the opening/closing unit receives from the moving unit in a state where the opening/closing unit is at the closed position is smaller than a maximum force that the opening/closing unit receives from the moving unit that is urged in the first direction by the urging portion while the opening/closing unit moves from the open position to the closed position.

2. The sheet feeding apparatus according to claim 1, wherein the transmitting portion is configured to urge the moving member in the second direction in a state where the opening/closing unit is at the closed position.

3. The sheet feeding apparatus according to claim 2, wherein in a state where the opening/closing unit is at the closed position, the moving member and the feed roller are located at positions separated from the opening/closing unit.

4. The sheet feeding apparatus according to claim 2, further comprising a stopper provided in the apparatus body and configured to come in contact with and hold the moving member urged in the second direction in a state where the opening/closing unit is at the closed position.

5. The sheet feeding apparatus according to claim 1, further comprising a restrict member configured to move between a restrict position where the restrict member is in contact with the transmitting portion to restrict movement of the transmitting portion and a release position where the restrict member retracts from the restrict position.

6. The sheet feeding apparatus according to claim 5, wherein the transmitting portion is configured to urge the moving member in the first direction in a state where the opening/closing unit is at the open position and the restrict member is at the release position.

7. The sheet feeding apparatus according to claim 5, wherein the restrict member is a cam that is configured to rotate by a driving force supplied from a driving source and move the transmitting portion in a state where the opening/closing unit is at the open position, and wherein the transmitting portion is configured to, along with a rotation of the cam, move the moving member in the first direction to bring the feed roller into contact with the sheet on the stacking portion and then move the moving member in the second direction to separate the feed roller from the sheet on the stacking portion.

8. The sheet feeding apparatus according to claim 1, further comprising a restrict member configured to move between a restrict position where the restrict member is in contact with the transmitting portion to restrict movement of the transmitting portion and a release position where the restrict member separates from the transmitting portion;

wherein the transmitting portion is configured to urge the moving member in the first direction in a case where the opening/closing unit is at the open position and the restrict member is at the release position, and wherein the transmitting portion is held by the restrict member in a state where the opening/closing unit is at the closed position.

9. The sheet feeding apparatus according to claim 1, wherein the transmitting portion includes a first surface that comes into contact with the moving member in a state where the opening/closing unit is at the open position and a second surface that comes into contact with the moving member in a state where the opening/closing unit is at the closed position.

10. The sheet feeding apparatus according to claim 9, wherein the moving member is configured to swing in the first direction and the second direction with respect to the stacking portion, and wherein an angle of the first surface is different from an angle of the second surface when viewed in a direction of a swing axis of the moving member.

11. The sheet feeding apparatus according to claim 1, wherein the moving member is configured to swing in the first direction and the second direction with respect to the stacking portion.

12. The sheet feeding apparatus according to claim 1, wherein the moving member is configured to be moved in the second direction by the stacking portion coming into contact with the feed roller along with a movement of the opening/closing unit from the open position to the closed position.

13. The sheet feeding apparatus according to claim 1, wherein the stacking portion configured to be exposed in a state where the opening/closing unit is at the open position and to be stored between a part of the opening/closing unit and the apparatus body in a state where the opening/closing unit is at the closed position.

14. A sheet feeding apparatus comprising:

an opening/closing unit including a stacking portion on which a sheet is stacked, and configured to be opened and closed between an open position and a closed position with respect to an apparatus body of the sheet feeding apparatus;

a moving unit including a feed roller configured to feed the sheet and a moving member supporting the feed roller, the moving member being movable with respect to the stacking portion in a first direction in which the feed roller approaches the stacking portion and in a second direction opposite to the first direction;

an urging portion;

a transmitting portion including a contact configured to contact the moving unit, the transmitting portion configured to (i) be urged by the urging portion and (ii) transmit urging force of the urging portion to the moving member to urge the moving member in the first direction; and a restrict member configured to move between a restrict position where the restrict member is in contact with the transmitting portion to restrict movement of the transmitting portion and a release position where the restrict member retracts from the restrict position, and wherein the opening/closing unit is configured to press and move the moving unit in the second direction against the urging force while the opening/closing unit moves from the open position to the closed position, wherein in a state where the opening/closing unit is at the open position and the transmitting portion is in contact with the restrict member located at the restrict position, the feed roller is configured to be at a position separated from the stacking portion, wherein in a state where the opening/closing unit is at a position between the open position and the closed position, the moving unit is configured to be in contact with the opening/closing unit and the transmitting portion is configured to urge the moving member in the first direction, and wherein in a state where the opening/closing unit is at the closed position, the transmitting portion is configured to urge the moving member in the second direction.

15. The sheet feeding apparatus according to claim 14, wherein in a state where the opening/closing unit is at the open position and the transmitting portion is in contact with the restrict member located at the restrict position, the transmitting portion is configured to urge the moving member in the first direction.

16. The sheet feeding apparatus according to claim 14, wherein the moving member is held by the apparatus body in a state where the opening/closing unit is at the closed position.

17. The sheet feeding apparatus according to claim 14, wherein the transmitting portion is held by the restrict member in a state where the opening/closing unit is at the closed position.

18. The sheet feeding apparatus according to claim 14, wherein the moving unit is at a position separated from the opening/closing unit in a state where the opening/closing unit is at the closed position.

19. An image forming apparatus comprising:

the sheet feeding apparatus according to claim 1; and an image forming unit configured to form an image on a sheet fed from the sheet feeding apparatus.

* * * * *